US011903526B2

(12) United States Patent
Kolar et al.

(10) Patent No.: US 11,903,526 B2
(45) Date of Patent: Feb. 20, 2024

(54) INTERLOCKING BLENDING SYSTEM

(71) Applicant: VITA-MIX MANAGEMENT CORPORATION, Olmsted Township, OH (US)

(72) Inventors: David J. Kolar, Stow, OH (US); Saifur T. Tareen, Copley, OH (US); Eric Miller, Olmsted Township, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

(21) Appl. No.: 17/941,467

(22) Filed: Sep. 9, 2022

(65) Prior Publication Data
US 2023/0000289 A1 Jan. 5, 2023

Related U.S. Application Data

(63) Continuation of application No. 16/571,485, filed on Sep. 16, 2019, now Pat. No. 11,439,277, which is a
(Continued)

(51) Int. Cl.
*A47J 43/00* (2006.01)
*A47J 43/07* (2006.01)
*A47J 43/046* (2006.01)
*A47J 43/08* (2006.01)
*H04B 5/00* (2006.01)

(52) U.S. Cl.
CPC ......... *A47J 43/0777* (2013.01); *A47J 43/046* (2013.01); *A47J 43/0761* (2013.01); *A47J 43/0766* (2013.01); *A47J 43/085* (2013.01); *H04B 5/0037* (2013.01)

(58) Field of Classification Search
CPC .. A47J 43/0777; A47J 43/046; A47J 43/0761; A47J 43/0766; A47J 43/085; H04B 5/0037
See application file for complete search history.

(56) References Cited

U.S. PATENT DOCUMENTS 2,372,862 A 4/1945 Strauss et al.
3,175,594 A 3/1965 Jepson et al.
(Continued)

FOREIGN PATENT DOCUMENTS

DE 102005040513 1/2007
EP 046169 2/1982
WO 2010052631 5/2014

OTHER PUBLICATIONS

International Search Report and Written Opinion for PCT/US2016/018335 dated Jul. 11, 2016.
(Continued)

*Primary Examiner* — Anshu Bhatia
(74) *Attorney, Agent, or Firm* — Dinsmore & Shohl LLP

(57) ABSTRACT

A blender system that includes a base that is selectively and operatively engaged with a container is shown and described herein. The base may include a near field communications chip that may communicate with a near field communications chip of a container. The base also includes a motor that is selectively and operatively engaged with a blade disposed within the container.

20 Claims, 11 Drawing Sheets

Related U.S. Application Data continuation of application No. 15/137,575, filed on Apr. 25, 2016, now Pat. No. 10,413,131.

(60) Provisional application No. 62/265,554, filed on Dec. 10, 2015, provisional application No. 62/152,380, filed on Apr. 24, 2015.

(56) References Cited

U.S. PATENT DOCUMENTS

| | | | |
|---|---|---|---|
| D237,503 S | 11/1975 | Langmack, Jr. et al. | |
| 3,961,721 A | 6/1976 | Gordon et al. | |
| D295,012 S | 4/1988 | Gelber | |
| 4,822,175 A | 4/1989 | Barnard et al. | |
| D301,824 S | 6/1989 | Machuron | |
| 4,883,144 A | 11/1989 | Haushalter et al. | |
| D321,647 S | 11/1991 | Oldorf | |
| 5,533,577 A | 7/1996 | Jucker | |
| 5,533,797 A | 7/1996 | Gelber | |
| 5,533,806 A | 7/1996 | Veltrop | |
| 5,696,358 A | 12/1997 | Pfordresher | |
| D406,154 S | 2/1999 | Copland et al. | |
| 5,957,577 A | 9/1999 | Dickson et al. | |
| 6,059,445 A | 5/2000 | St. John et al. | |
| D426,423 S | 6/2000 | Lee | |
| D427,016 S | 6/2000 | Kindig et al. | |
| D428,564 S | 7/2000 | Kao | |
| D432,864 S | 10/2000 | Kindig | |
| D466,761 S | 12/2002 | Stuart et al. | |
| 6,513,396 B2 | 2/2003 | Nakamura | |
| 6,571,908 B2 | 2/2003 | Bohannon et al. | |
| D471,059 S | 3/2003 | Chuang | |
| 7,018,091 B2 | 3/2006 | Arroubi et al. | |
| D526,845 S | 8/2006 | Katz et al. | |
| D528,364 S | 9/2006 | Kolar | |
| 8,226,021 B2 | 7/2012 | Wilson | |
| 8,287,180 B2 | 10/2012 | Kolar | |
| 8,403,556 B2 | 3/2013 | Wu | |
| 8,529,118 B2 | 9/2013 | Davis | |
| 8,807,818 B2 | 2/2014 | Hirahata | |
| 8,702,300 B2 | 4/2014 | Audette | |
| RE45,308 E | 12/2014 | Kolar et al. | |
| RE45,655 E | 8/2015 | Kolar et al. | |
| 2002/0079393 A1 | 6/2002 | Karkos et al. | |
| 2003/0034200 A1 | 2/2003 | Bohannon et al. | |
| 2003/0042805 A1 | 3/2003 | Bates et al. | |
| 2004/0100862 A1 | 5/2004 | Arroubi et al. | |
| 2005/0152215 A1 | 7/2005 | Stuart et al. | |
| 2011/0248108 A1 | 10/2011 | Carriere | |
| 2012/0027902 A1 | 2/2012 | Audette et al. | |
| 2012/0206995 A1 | 8/2012 | Wu | |
| 2013/0074706 A1 | 3/2013 | Fevre | |
| 2014/0001296 A1 | 1/2014 | Gen | |
| 2014/0217211 A1 | 8/2014 | Sanford et al. | |
| 2014/0286120 A1* | 9/2014 | Kolar | B01F 35/2205 366/241 |
| 2015/0035381 A1 | 2/2015 | Mach et al. | |
| 2015/0090527 A1 | 4/2015 | Salour et al. | |
| 2016/0079774 A1 | 3/2016 | Baarman et al. | |

OTHER PUBLICATIONS

Extended European Search Report for Patent Application No. 20153842.8 dated May 19, 2020.
International Search Report and the Written Opinion of the International Searching Authority, PCT/US2016/029165, Vita-Mix Management Corporation, dated Aug. 2, 2016.

\* cited by examiner

INTERLOCKING BLENDING SYSTEM

CROSS-REFERENCE TO RELATED APPLICATION

This application is a continuation of U.S. patent application Ser. No. 16/571,485, filed on Sep. 16, 2019, entitled "INTERLOCKING BLENDING SYSTEM," which is a continuation of U.S. patent application Ser. No. 15/137,575, filed on Apr. 25, 2016, entitled "INTERLOCKING BLENDING SYSTEM," now U.S. Pat. No. 10,413,131, which claims priority to U.S. Provisional Application No. 62/152,380 entitled "INDUCTIVE INTERLOCK SYSTEM," filed on Apr. 24, 2015, and U.S. Provisional Application No. 62/265,554 entitled "INTERLOCKING BLENDING SYSTEM," filed on Dec. 10, 2015, which are all hereby incorporated by reference in their entirety.

TECHNICAL FIELD

The present teachings relate to an interlock system for a blender, and more particularly, to a blender lid system utilizing wireless power transmission for interlocking a blender system.

BACKGROUND

Blender systems are often used to blend and process foodstuffs. Conventional blenders generally include a base with a motor, a mixing container with an operable mixing blade disposed therein. A blender lid is adapted to cover the mixing container. A user inserts contents within the mixing container to be mixed by the rotation of the blade. The container is positioned on the base as a user controls the operation of the motor within the base to rotate the mixing blade within the container to mix the contents therein.

It may be desirable to generally prevent the mixing blades from rotating when the blender lid is completely removed from the container. Interlock systems may be utilized to attempt to prevent the mixing blades from rotating when the blender lid is not positioned on the container. These interlock systems generally prevent the operation of the rotation of the mixing blade unless the blender lid is covering the mixing container. Known blending interlock systems have been disclosed by U.S. Pat. No. 8,403,556 to Wu to include a latch cover mechanism with a link rod and a compression spring in communication with a power circuit control switch in the base of the blender. Additionally, U.S. Pat. No. 8,702,300 to Audette discloses a blending apparatus having a container, a lid for covering the container, and an attachment within the container. The attachment engages the lid and a drive member at the base of the blender to actuate a motor once the lid is secured to the container.

Typically, known blender interlocks require a physical connection between the lid and the motor. These interlocks generally include a system of mechanical arms, links, springs or other attachments that prevent the user from operating the motor to rotate the mixing blade unless the blender lid is secured onto the container. Generally, known blender system interlocks are subject to damage or failure caused by the vibrations of the operating motor, normal wear, users, or the like. These interlock mechanisms can fail and cause a false actuation, giving a signal the blender lid is in place when, in fact, it is not. Further still, these mechanical systems may be difficult to clean.

Additionally, mechanical interlock systems take up extra space for mechanical connection paths and these connection paths may not allow for sufficient vibration isolation or damping.

Furthermore, traditional blender systems may be designed to utilize a particular blending container with a particular blending base. For example, a blender base may have a dedicated blending container that is designed to attach to the blender base. If a user attaches the wrong blending container to the blender base, then the blender may not function properly. This can lead to spilled contents, excess noise, improper functioning of the blades, or the like.

Therefore, a need exists for improved blender systems.

SUMMARY

A blender system may include a blender base and a container that is operably engaged with the base, where the container includes an open end. A lid may be configured to be selectively attached to the container to cover the open end. The blender base may include a motor that operatively engages a blade assembly disposed within the container. The container may comprise a near field communications (NFC) chip that may receive power and communicate with an NFC component of a blender base when the container and the blender base are interlocked.

A method for operating a blender system is described herein. The method may include providing a blender base with a first NFC component disposed therein, and providing a container with a second NFC component disposed therein. The method may further include determining whether the container and the blender base are interlocked based on identifying whether the first NFC component receives a response from the second NFC component. In another aspect, the method may include receiving instructions from the second NFC component for operation of a motor of the blender base.

DESCRIPTION OF THE DRAWINGS

The present teachings may be better understood by reference to the following detailed description taken in connection with the following illustrations, wherein.

DETAILED DESCRIPTION

Figure 1A:
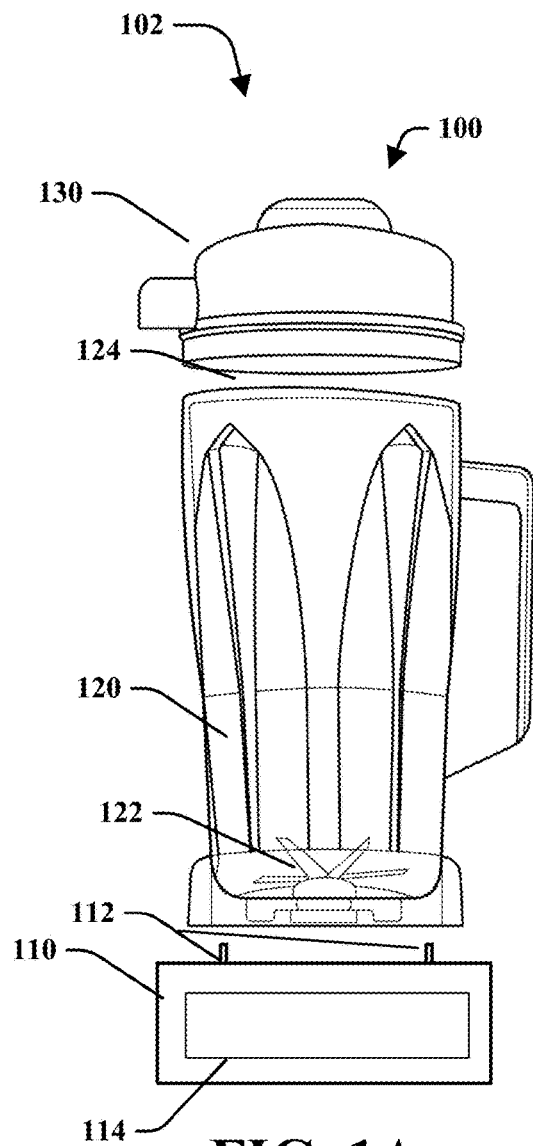
FIG. 1A is a front view of an embodiment of a blender system in a non-interlocked state in accordance with the present disclosure.

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that references to a blender, blender system, and the like, are understood to include food processor systems, and other mixing systems. Such systems generally include a blender base that may include a motor, a blade assembly, and a controller. Further, such systems may include a container, a display, a memory and/or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Moreover, blending of ingredients may result in a blended product. Such blended products may include drinks, frozen drinks, smoothies, shakes, soups, purees, sorbets, butter (nut), dips or the like. Accordingly, such terms may be used interchangeably unless context suggests otherwise or warrants a particular distinction among such terms. Further, such terms are not intended to limit possible blended products and should be viewed as examples of possible blended products.

In embodiments, the blending systems may include any household blender and/or any type of commercial blending system, including those with covers that may encapsulate or partially encapsulate the blender. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

A blending system with interlocking capabilities is described herein. In an aspect, embodiments generally include a blender base (housing a motor), a near field communication (NFC) component(s), a container, and a lid. In an aspect, the blender system can determine whether the blender base, container, and lid are "interlocked" (e.g., they are in an operative position whereby a user is prevented from contacting the blades). The NFC components disposed in at least one of the blender base, container, or lid. When the blender system is fully connected, the near field communication components may interact with each other. The interaction may allow operation of a motor and rotation of the blades within the container.

The terms "identification tag," "chip," "NFC component," and the like may be used interchangeably, unless context suggests otherwise or warrants a particular distinction among such terms. Such may refer to an NFC component or tag, which may be capable of sending/receiving a signal. It is noted that embodiments may utilize other radio frequency identification (RFID) devices, transponders, or tags. Accordingly, embodiments reference NFC for brevity, but such embodiments may utilize other RFID devices, methods, or systems. It is further noted that RFID tags may be chosen based on a frequency (e.g., low frequency RFID tags for close communication). Identification tags may comprise printable RFID tags, NFC tags, tags including microchips, or the like. Identification tags can contain stored information, such as in a memory (e.g., read-only memory (ROM), random access memory (RAM), electrically erasable programmable read-only memory (EEPROM), or various other types of memory). In another aspect, an identification tag may be powered by electromagnetic induction from magnetic fields produced by a reader. For instance, an identification tag may include an NFC component that uses induction between two loop antennas located within the container's near field, effectively forming an air-core transformer. The antennas may comprise various materials, such as copper. While an air-core transformer is described, various other antenna formations may be utilized.

In an example, an NFC component may include an NFC tag and an NFC emitter. The NFC tag and NFC emitter may each include one or more antennas. For instance, the NFC tag may include a loop antenna and the NFC emitter may include another loop antenna. It is noted that the loop antennas may or may not be substantially similar to each other. The NFC tag antenna and NFC emitter antenna may be operatively coupled via an electromagnetic field. The coupling may form or represent an air-core coil or transformer. The NFC emitter may generate an alternating current that may be received by the NFC emitter antenna. The current may induce an electromagnetic field through the air or another carrier medium. The electromagnetic field may induce a current in the NFC tag antenna. The received current may provide power to various components of the NFC tag.

In various embodiments, an NFC tag may include the antenna (e.g., inlay), a processor, and a memory device. The memory device may include various types of memory, such as electrically erasable programmable read-only memory (EEPROM) and the likes. When the NFC tag is powered (e.g., current induced by the electromagnetic field), the NFC tag may generate a response that may be received by the NFC emitter.

As described herein, the identification tag may be a passive transponder that collects energy from interrogating radio waves and/or may include a local power source such as a battery. As such, an identification tag and a reader may be configured as a passive reader active tag (PRAT) system, active reader passive tag (ARPT) system, an active reader active tag (ARAT) system, or the like.

In another aspect, an identification tag may power various components or devices. For example, an NFC component may power a digital display and/or interface of a container. In embodiments, the identification tag may be configured to operate and/or communicate with a reader when within a threshold distance. For instance, an identification tag may communicate with a reader when the identification tag is less than or equal to j units from the reader, where j is a number and the unit is a unit of distance. In an example, the identification tag may operate when it is less than or about six centimeters from the reader, when it is less than or about one meter from the reader, etc.

Some traditional blender systems include a container that interlocks with a blender base via mechanical actuators. For example, a push rod or arm of a container may physically press a button of, or lock with, the blender base. Such blender systems may be prone to damage and failure. Additionally, the added mechanical actuators add to the size of blender systems.

In another aspect, containers may have an expected lifetime. The lifetime may be based on the amount of blending cycles, the total time spent blending, or the like. Traditional blender systems have no way of determining or tracking this information. For example, a restaurant may own multiple containers that may be utilized for a blender base. This allows the restaurant employees to make drinks or other products in one container, then make a drink in a different container while the first container is being cleaned. Traditional blending devices cannot determine if multiple containers are utilized. Thus, users cannot know the amount of use associated with a container. This may be beneficial if a container needs to be serviced after a pre-determined number of cycles—keeping track of the cycles may allow a notification to be produced to service the applicable container.

Aspects of systems, apparatuses or processes described herein generally relate to blending or mixing systems include a blending container that may comprise an NFC component. The NFC component may be embedded into the container, attached to the container, or otherwise coupled with the container. The container may be placed on or connected to a blender base. The blender base may communicate and/or power the NFC component. Powering the NFC component may allow the NFC component to communicate with a processor within the blender base. For example, the processor may communicate with the NFC component to determine whether the container and blender base are interlocked, determine a container identification (ID) and/or characteristics (e.g., make/model), etc.

Figure 1B:
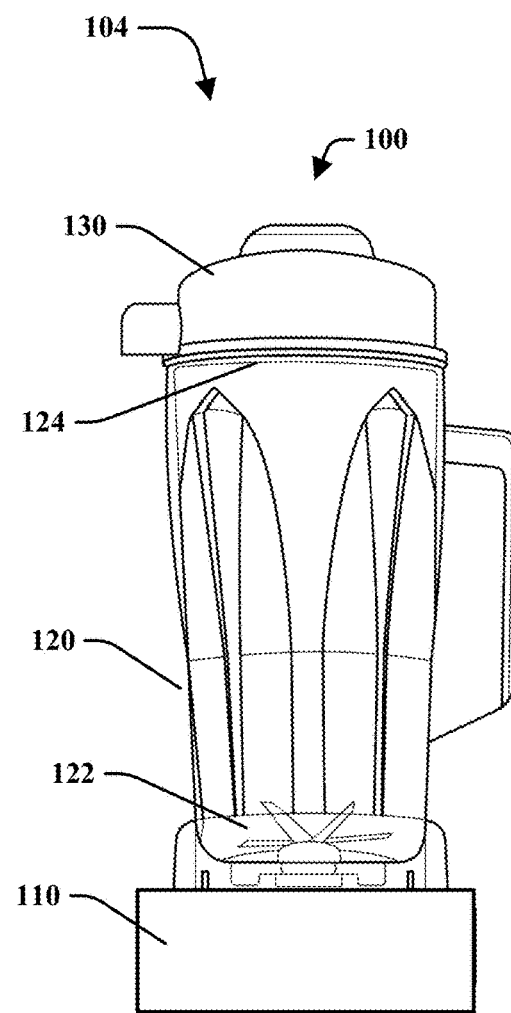
FIG. 1B is a front view of the blender system of FIG. 1A in an interlocked state in accordance with the present disclosure.

Referring now to FIGS. 1A and 1B, there depicted is a front view of a blending system 100 in a non-interlocked state 102 and an interlocked state 104. The blending system 100 may primarily include a base 110, a container 120, and a lid 130. The base 110 may be any appropriate size and configuration. The base 110 may house and generally protect the operative components of the blending system 100, such as a motor, fan, controllers, circuitry, human interfaces (e.g., touch screen, LED or LCD displays, lights, buttons, knobs, dials, or other actuators), and the like. As illustrated, the base 110 may include a control panel 114 positioned on a face of the base 110 such that a user may interact with the control panel 114. The control panel 114 may be of any appropriate configuration and may allow a user to set the operative condition of the blending system 100. It will be appreciated that the control panel 114 may include one or more human interfaces.

Container 120 may include and/or be coupled with an agitator or blade assembly 122. The blade assembly 122 may be of appropriate configurations and may operatively rotate within the container 120 (e.g., via a motor). For instance, a user may place foodstuff in the container 120 to allow blade assembly 122 to chop, mix, blend, or otherwise interact with the foodstuff.

In interlocked state 104, the container 120, base 110, and lid 130 may be interconnected in an appropriate manner. For instance, lid 130 may be attached or coupled to an open end 124 of container 120. According to an embodiment, the lid 130 may be press-fit (e.g., friction fit) within or about the open end 124, twisted (e.g., via threaded members), latched, or otherwise connected with the open end 124. It is noted that lid 130 and container 120 may be coupled via various other means, including magnetic means, VELCRO, mechanical fasteners, or the like.

Furthermore, container 120 may be attached to or otherwise operatively engaged with the base 110. In at least one embodiment, base 110 may include protrusions 112 that guide the alignment of container 120. It is noted that the container 120 may be attached to the base by threaded members, fasteners, press-fit geometries, magnetic means, or the like. In at least one embodiment, the weight of container 120 may provide sufficient force to maintain a connection between base 110 and container 120.

Blade assembly 122 may include a splined shaft that operatively engages with a splined coupling of the base 110. For instance, when the container 120 is operatively placed on base 110, the splined coupling receives the splined shaft, which depends downwardly from the bottom of the container 120. A motor may drive the splined coupling that, in turn, drives the splined shaft. Driving of the splined shaft causes rotation of the blade assembly 122 within the container 120.

In the non-interlocked state 102, the container 120 is not operatively connected to at least one of the lid 130 or base 110. It is noted that FIG. 1A depicts the container 120 as not operatively connected to both the lid 130 and base 110. According to embodiments, the blending system 100 may prevent or prohibit operation of the motor when in the non-interlocked state 102 and may allow or enable operation of the motor when in the interlocked state 104. Alternatively or additionally, when in the interlocked state 104, the blade assembly 122 may be prevented from rotating.

Embodiments will be described herein with reference to FIGS. 1A and 1B. It is noted that the configurations of base 110, container 120, and lid 130 are provided for reference and example. As such, various other configurations are within the scope and spirit of this disclosure.

Figure 2:
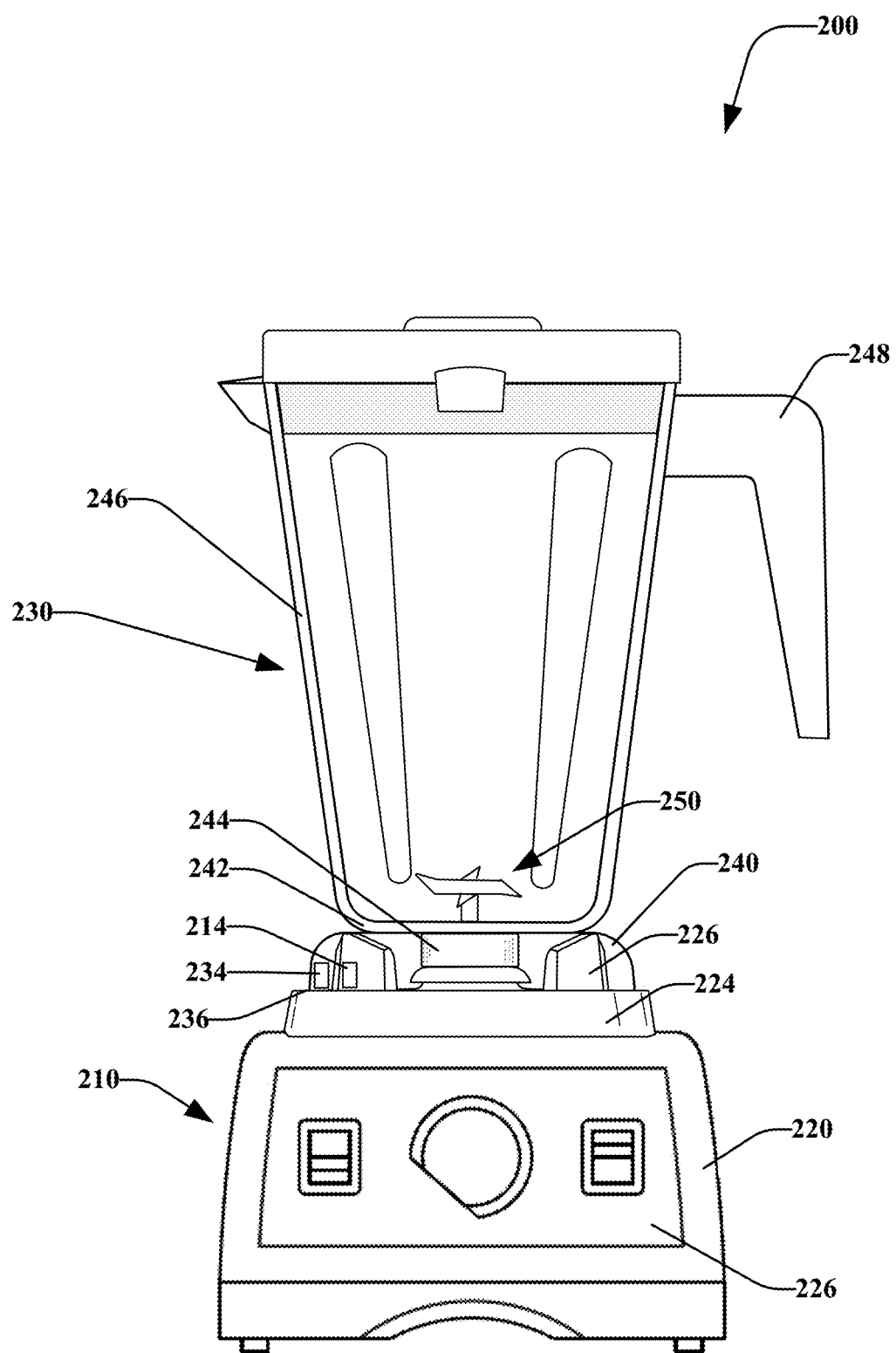
FIG. 2 is a front view of a blending system including a container comprising an NFC component in accordance with various disclosed aspects.

Turning to FIG. 2, there is a front view of a blender system 200 that may comprise an NFC interlocking mechanism in accordance with various disclosed aspects. The blender system 200 may include a blender base 210 and a container 230. The blender base 210 and the container 230 may comprise NFC component 214 and NFC component 234, respectively. As described herein, NFC components 214/234 may comprise transceivers, receivers, memory devices, a processor or the like.

Container 230 and blender base 210 may each include one or more NFC components. For instance, the blender base 210 may include k NFC components and container 230 may include i NFC components, where k and i are numbers. While embodiments may refer to one or more NFC components for brevity, it is noted that container 230 may comprise i, and blender base 210 may comprise k NFC transmitters and/or receivers that are coupled to an NFC component. Moreover, an NFC component may be comprise on one or more silicon wafers, printed circuit boards, flexible circuit boards, or the like.

In at least one embodiment, the NFC component 214 may be disposed at various locations of the blender base 210. For instance, blender base 210 may include a body 220, an attachment member 224 (e.g., pedestal, attachment pad, etc.) that may include one or more protrusions 226, and a control panel 228. The NFC component 214 may be disposed in one or more of the body 220, attachment member 224, and/or control panel 228. It is noted that that NFC component 214 may be disposed in a position that may be proximal to the NFC component 234 when the container 230 is operatively coupled with the blender base 210. It is further noted that NFC components 214 and 234 may comprise antennas that may span a distance to allow for multiple interlocked positions. For example, NFC component 234 may comprise a loop antenna that generally circumvents a blade assembly and NFC component 214 may comprise a loop antenna that generally circumvents a coupler and/or attachment member 224.

NFC component 234 may be disposed at various locations, such as at apron 240, closed end 242, retainer nut 244, wall 246, and/or within blade assembly 250. It is noted that NFC component 234 may be disposed in other locations such as handle 248 or the like. In another aspect, NFC component 214 may be disposed within blender base 220 at a location selected such that the NFC component 214 and NFC component 234 may communicate. For instance, one or more protrusions 226 may comprise one or more NFC components 214, and container 230 may comprise one or more NFC components 234 in apron 240, such that the NFC components 214 and 234 may be proximal to each other when container 230 is operatively coupled to the blender base 210. In an aspect, at least two protrusions 226 may each comprise an NFC component 214 and container 230 may comprise at least two NFC components 234. This may ensure that container 230 is properly attached to the blender base 210 such that each of the NFC components 214 detect an NFC component 234 of the container 230. Detecting multiple NFC components 234 may allow container 230 to be attached to blender base 210 in various operable positions.

It is noted that the NFC component may be disposed in a separate device that is operatively attachable to container 230, base 210, and/or other portions of blender system 200. By way of a non-limiting an example, NFC component 234 may be disposed in a disc that is selectively engageable with the retaining nut 244. In these embodiments, the disc may be selectively attached with the retaining nut 244 (or any other appropriate portion of the container 230) and may communicate as described herein with the NFC component 214. This may allow an existing container to be retrofitted with the NFC component 234 to communicate with the base 210. In examples, NFC component 214/234 may be embedded within a material, adhered to a material, sealed on a surface, disposed on a surface, may be removable, or the like. For example, the disc may be molded into the retaining nut 244 or a portion thereof. In embodiments, sealing may include providing a protective barrier to isolate the NFC component 214/234 from an external atmosphere or environment, including, without sealing the NFC component 214/234 such that it is capable of withstanding a dish washer. For instance, exposure may allow for damage from fluid, foodstuff, or other contaminants that may corrode or otherwise harm the NFC component 214/234.

According to embodiments, at least one of the NFC components 234 may be disposed near closed or proximal end 236 of container 230. For instance, the NFC component 234 may be disposed within or proximal to apron 240 of the container 230. As shown in FIG. 2, the NFC component 214 may be proximal NFC component 234 when the container 230 is interlocked with the blender base 210. The sensitivities and/or communication ranges of NFC component 214 and NFC component 234 may be selected such that NFC components 214 and 234 will communicate (e.g., are within range of each other) when the container 230 and blender base 210 are operatively interlocked as shown in FIG. 1B, and will not communicate (e.g., are outside the range of each other) when the container 230 and blender base 210 are not interlocked, as shown in FIG. 1A.

NFC component 214 may receive power from a power source (e.g., power mains, battery, etc.) coupled to the blender base 210. For instance, NFC component 214 may receive power when the blender base 210 is plugged into an outlet and/or switched on. NFC component 214 may transmit a signal that may operatively excite or power the NFC component 234 when the container 230. It is noted that the signal may be configured to excite the NFC component 234 only when the NFC component 234 is within a determined distance, such as when the container 230 is operatively interlocked with the blender base 210. For instance, a transmitter of NFC component 214 may provide a signal at a given frequency, wherein the signal may be received by a receiver of NFC component 234. Excitement of the NFC component 234 may elicit a response from NFC component 234 and NFC component 214 may receive the response. When the NFC component 214 receives the response, it may allow for operation of a motor. If no response is received and/or a weak response is received, the container NFC component 214 may prevent or prohibit operation of the motor. It is noted that the NFC component 234 may comprise its own power source and/or may receive power from a disparate source.

Figure 11:
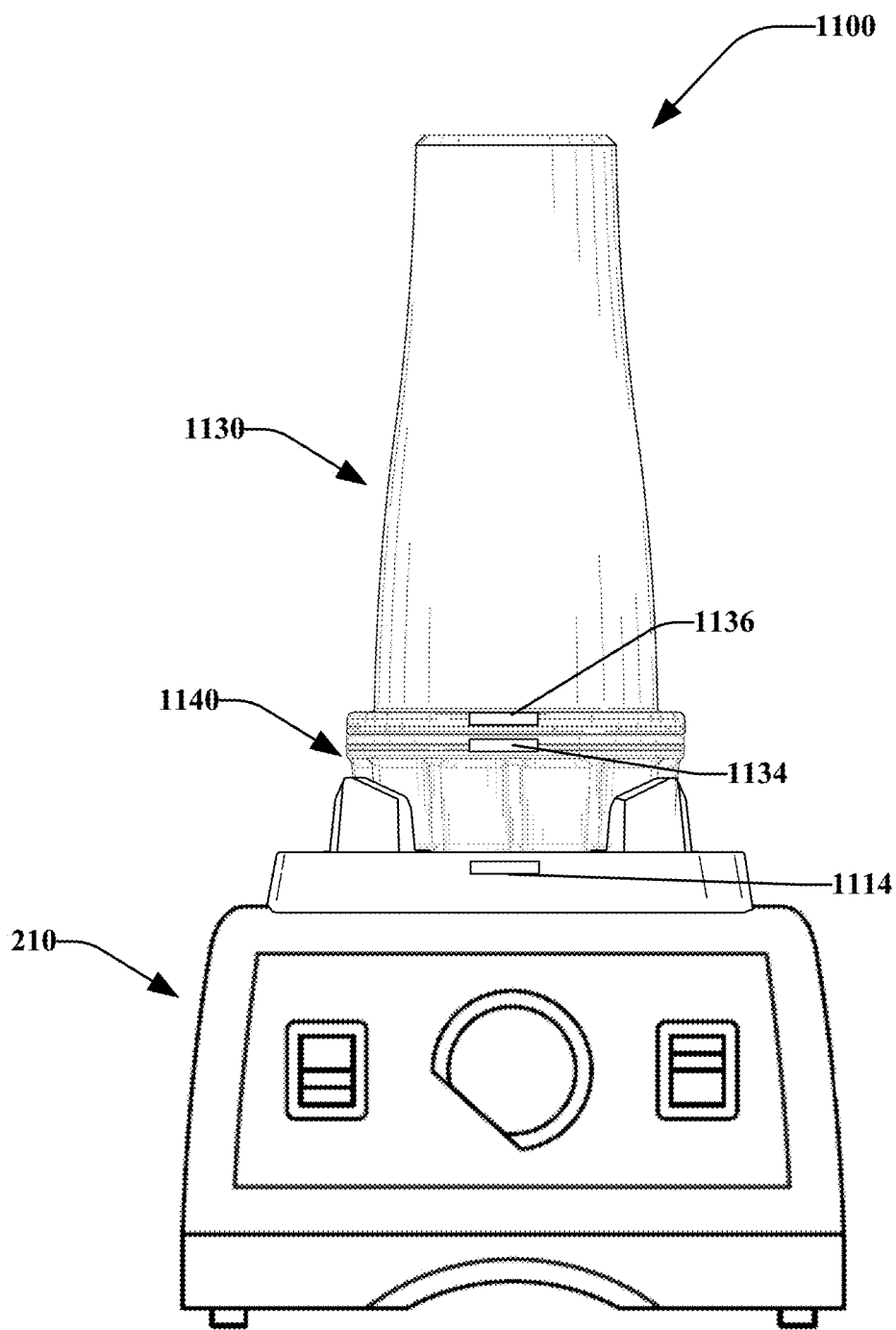
FIG. 11 is front view of a blending system including a single serving container comprising an NFC component in accordance with various disclosed aspects.

More over, while FIG. 2 describes a pitcher-style container and blade assembly, it is noted that other containers may be utilized in accordance with the disclosed aspects. For instance, with reference to FIG. 11, there is a blending system 1100 that may include base 210, which may operatively receive a single serving container 1130 that may be operatively attached with a blade base 1140. The blade base 1140 may comprise at least one NFC component 1134, and the container 1130 may comprise an NFC component 1136. It is further noted that the base 210 may comprise an NFC component 1114 disposed in a position that allows it to communicate with at least one of NFC component 1134, or 1136. In at least one embodiment, NFC components 1134 and/or 1136 may be replaced with a switch and actuator (e.g., reed switch and magnet). Moreover, system 1100 may or may not include NFC component 1134 and/or 1136. It is noted that a "single serving" container does not indicate a limited use for the container, but rather refers to a differently configured container that may be attached to a blade base. Such containers may have a closed end that is generally distal from a blender base when the container, blade base, and blender base are interlocked.

Figure 3:
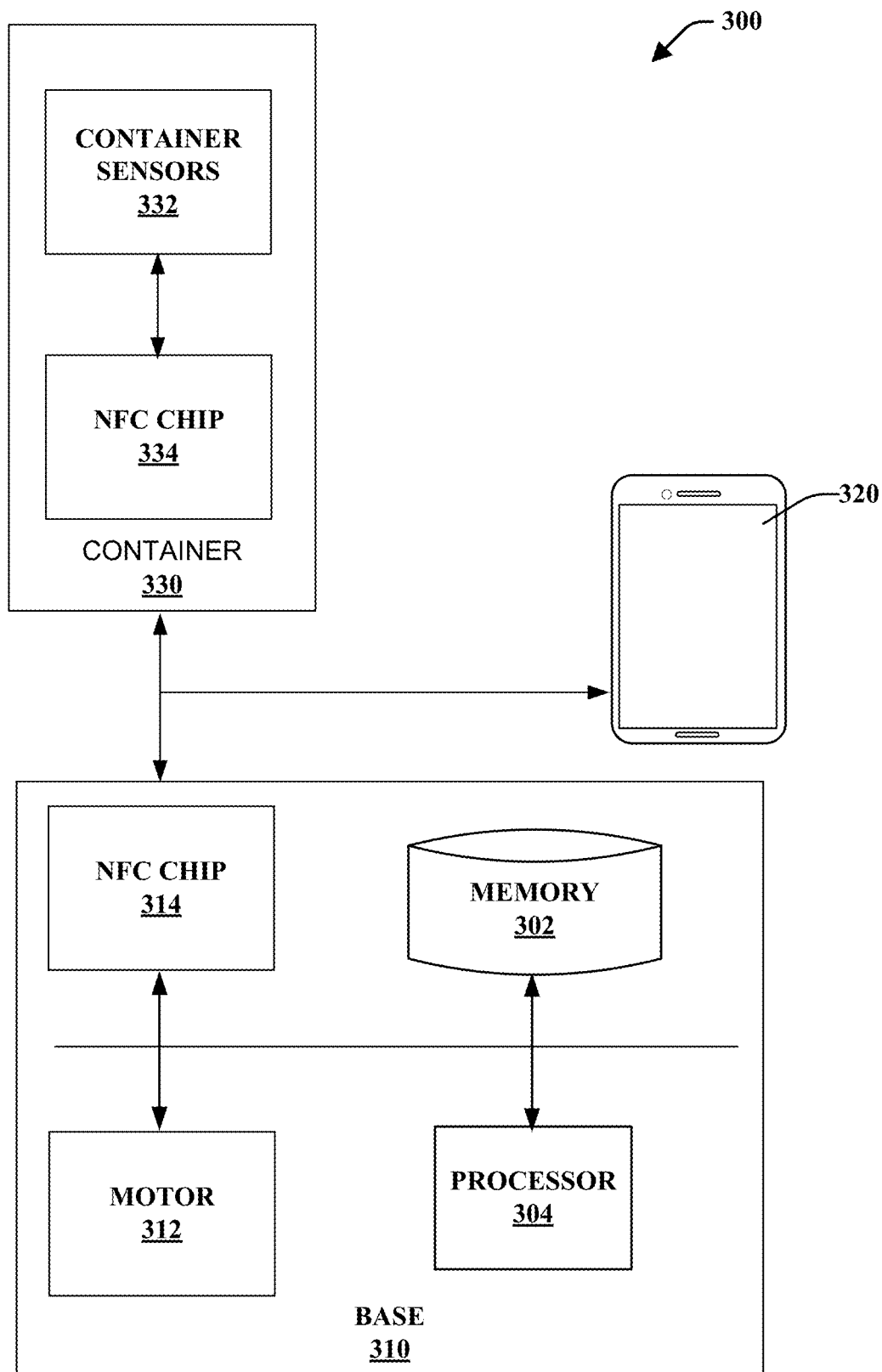
FIG. 3 is a function block diagram of a blending system including one or more sensors disposed within a container in accordance with various disclosed aspects.

Referring now to FIG. 3, with reference to the other disclosed figures, there is a functional block diagram of a blender system 300. It is noted that like-named components of systems 300 and 200 may comprise similar aspects and/or functionality. For instance, base 210 and base 310 may comprise similar aspects and/or may comprise the same base. It is further noted that system 300 may comprise other or additional components, such as a second container.

Base 310 may comprise a memory 302, a processor 304, an NFC component 314 and a motor 312. The motor 312 may operatively drive a blade assembly (e.g., blade assembly 250). Memory 302 may store computer executable instructions. Processor 304 may facilitate execution of the computer executable instructions. According to embodiments, memory 302 may store blender processes or programs. For example, a user may select a desired blending program via control panel 226, such as a "soup" program. The memory 302 may store the blending program, which may comprise blender settings and operations to be carried out by the motor 312 to make a soup. The processor 304 may receive the blending program from memory 302 and may generate instructions for the motor 312 and/or other components (e.g., a display—not shown) based on the blending program. It is noted that the memory 302 may store any number of blending programs, including user-defined programs.

According to one or more embodiments, the base 310 may include NFC component 314 that may communicate with NFC components of one or more other devices. For instance, NFC component 314 may communicate with NFC component 334 of container 330, an NFC component of user device 320, or the like. When NFC component 334 is within a predefined range (e.g., distance) from NFC component 314, the base 310 and container 330 may communicate. As described herein, the NFC component 334 may be configured such it is within an operable range when container 330 and base 310 are interlocked, and it is outside the operable range when the container 330 and the base 310 are not interlocked. When in the operable range, NFC component 314 may power NFC component 334 to elicit a response, such as to indicate whether the system is interlocked or to request data.

In at least one embodiment, NFC component 334 may comprise a memory device that may store blending program (s) and/or instructions associated with blending programs (e.g., instructions modifying blending programs). These blending programs may be specific to container 330. For example, a single serving container may be associated with different blending programs than a full sized container (e.g., container 230, pitcher-type container). Identification of the container may ensure that system 300 does not run blending programs designed for a full sized for a single serving container and vice versa. In another aspect, when a user interlocks container 330 with base 310, the NFC component 334 may provide the program to NFC component 314. In an aspect, processor 304 may facilitate storage of the program in memory 302 and/or may instruct the motor 312 to execute the program directly from the received instructions/program (e.g., without storing the program in memory 302). It is noted that the NFC chip 334 may store information that identifies compatible programs without storing the program itself. Such programs may be stored within base 310, and base 310 may enable/disable the availability of programs based on information received from NFC chip 334.

In an example, base 310 may be configured to interact with a certain make/model of a container 330. For instance, at some point after a user initially acquires blender system 300, a new blade or container shape may be created. A user may purchase the new blade/container for use with the base 310. The new blade/container may be designed for specific blending programs, which may be different from blending programs stored by the base 310. For instance, the new blade/container may allow for completion of a blending process in less time than previous blending programs. Once purchased, the user may place the new container on the base 310 and the new container (e.g., via an NFC component) may provide one or more programs and/or sets of instructions to the base 310. The base 310 (e.g., via processor 304) may alter previous blending programs, add new blending programs, or otherwise update stored blending programs based on the new instructions/blending programs. It is noted that the base 310 may update the blending programs upon detecting container 330 and/or in response to user instructions. For example, the base 310 may automatically update programs (e.g., without user intervention) or may update the programs when a user instructs the base 310 to do so. Further, the new container may include a new and/or different blade assembly from the previous version used with the base 310. The new container (e.g., via an NFC component) may provide one or more programs and/or sets of instructions to the base 310 based upon the blade assembly being utilized.

According to another aspect, the base 310 may identify container 330. Identifying container 330 may include identifying a make, model, a particular container (e.g., via a unique identifier), blade assembly utilized in the container, or the like. In an example, identifying the container may include determining a match between received data and data stored in memory 302. For example, a set of identifiers may be stored in a table or other data structure in memory 302. The NFC component 314 may receive an identifier from NFC component 334 and/or decode data received therefrom to determine an identifier. The identifier may then be compared to stored identifiers. It is noted that blender base 314 may communicate with user device 320 to access a communication network (e.g., a cloud) and/or components of the user device 320. For instance, the user device 320 may store container IDs.

In embodiments, a container ID may be associated with a container profile. The container profile may include characteristics or parameters of a blending container. For instance, the container profile may include information such as make and model of the blending container, weight of the blending container (e.g., with and without a lid, attachments, and the likes), compatible blender bases, size of the blending container (e.g., capacity, height, volume, etc.), interlock of the blending container, blades utilized with the container, color, name of the blending container, date purchased, date profile was created, and the likes. The container profile may store a history of use associated with a blending container as described herein.

In another aspect, the base 310 (or another receiver device) may verify whether the container 330 is compatible with the base 310 based on information received from the NFC component 334. For instance, the NFC component 334 may store a list of blenders (e.g., makes, models, etc.) to which container 330 is compatible, parameters of the container 330 (e.g., make/model), or the like. Base 310 (e.g., via processor 304) may receive the parameters and/or query the NFC component 334 to determine whether the container 330 is compatible with the base 310. If the container 330 is compatible with base 310, then base 310 may allow operation of motor 312. If the container 330 is not compatible with the base 310, then the base 310 may disable or prevent certain operations, such as activation of a motor 312 and/or a blade assembly. In at least one embodiment, the base 310 may determine whether container 330 is properly attached, such as by determining a proximity of the container 330 and the base 310. Thus, a blender system may prevent spillage of contents, improper functioning of the blades, or the like.

In another aspect, the system 300 may prevent use of improper or undesirable container and base combinations. It is noted that identification of a container 330 may allow base 310 to verify the container to prevent improper containers (e.g., counterfeit) from being utilized, determine whether processes are compatible with a container, or the like. For example, if an authorized or improper container is detected by the base 310, the motor 312 may be prevented from operating, which in turns prevents the blades from turning.

System 300 may track a history of use associated with container 330. Traditional systems do not track use of a container. Some systems may track use of a blender base, but users may utilize different containers for a given blender base. Tracking the use of a blender base does not indicate the use of the containers as the containers may be interchanged with blender bases. In commercial kitchens, users typically utilize multiple containers for one or more blender bases. This allows the user to prevent cross contamination of ingredients from different blending processes and may allow the users to make multiple products quicker than they could with only one container per blender base. Disclosed embodiments may track the use of each container and/or use of each blender base. For instance, NFC component 334 may store information associated with run time, cycles used, last date/time of use, types of programs run, or the like. The NFC component 334 may monitor the use and facilitate storage of the use via a memory device. In an example, when the NFC component 334 is powered, it may keep track and store on-time or run-time as a flag can be set when the motor 312 is running. It is noted that base 310, user device 320, or another device may additionally or alternatively store use information associated with the containers.

In another example, the blender base 330 (e.g., via processor 304) may provide instructions to the NFC component 334 to facilitate updating (e.g., replacing) the historical use data. For instance, the blender base 330 may transmit, via NFC component 314, instructions or data that may cause NFC component 334 to update historical data stored on the container upon occurrence of a triggering event. A triggering event may include the end of each blending process, at intervals during a blending process, prior to container 330 being removed, when container is placed on the base 310, or upon user action (e.g., user manually changes a blending process, etc.).

In at least one described embodiment, user device 320 may receive usage data associate with container 330. The usage data may be received via NFC communication, such as from container 330 and/or base 310. In some embodiments, the base 310 may communicate with user device 320 via other wireless or wired communication mechanisms (e.g., Wi-Fi, hard-wired, BLUETOOTH™, etc.). For instance, base 310 may send container usage data to user device 320. In an example, user device 320 may be a tablet, computer, or other device of a commercial kitchen (e.g., restaurant, café, bistro, etc.). A worker of the commercial kitchen may receive the usage statistics and may select a container having less use compared to other containers. This may allow the commercial kitchen to prevent or manage overuse of a certain container. In another aspect, it may allow the users to determine when to replace a container.

As described herein, user device 320 may communicate with base 310 and/or container 330. For instance, user device 320 may comprise an NFC component disposed therein. A user may tap (e.g., place within a coverage area) the user deice 320 with container 330 and/or base 310. As an example, the NFC component of the user device 320 may communicate with the container 330 and may receive usage data, container parameters (e.g., type, make, model, etc.), or other appropriate data. As an illustrative example, a user may wish to order a replacement container or a replacement part for a container, such as a replacement tamper. Traditionally, the user would have to know a make/model of the container to order the replacement. Here, the user device 320 may communicate with the container 330 and the user device 320 may automatically direct a user to a website or provide instructions that enable the user to order replacement parts. Thus, the user need not know the make/model of the container.

In another aspect, a user device 320 may update information stored by the container 330 and/or base 310. For instance, a user may download, create, or otherwise access a recipe via the user device 320. The user may utilize the user device 320 to instruct the container 330 and/or base 310 to update blender programs or identification information. As another example, the user may alter identification information associate with the container 330 and/or base 310. For instance, the user may identify a specific container 330 as containing, having contained, or utilized for nuts. When a user places the container 330 on the base 310, the base 310 may recognize the container 330 and display (e.g., via a screen, LED, etc.) information identifying the container as containing, having contained, or utilized for nuts.

Figure 4:
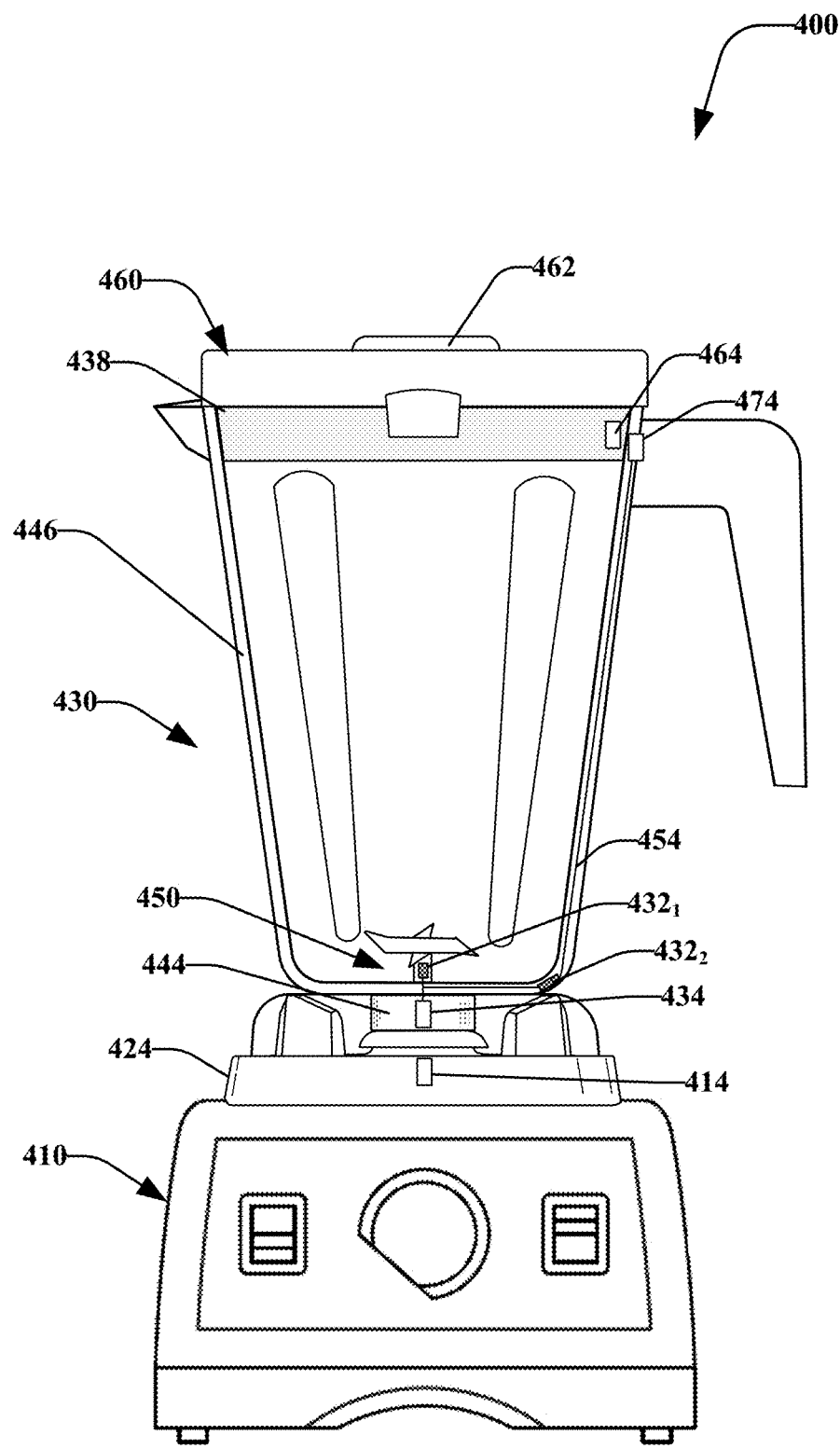
FIG. 4 is front view of a blending system including a lid comprising an NFC component in accordance with various disclosed aspects.

Turning to FIG. 4, with reference to the other figures, there is a blender system 400 that may include a container with an NFC component and one or more sensors. It is noted that like-named components of FIG. 4 and FIGS. 2-3 may comprise similar or identical aspects. For example, blender base 210 and blender base 410 may comprise the same or a similar blender base.

System 400 may include container blender base 410, container 430, and lid 460. As illustrated, container 434 may include NFC component 434 that may be configured to communicate with NFC component 414 of blender base 410. In an aspect, NFC component 444 may be disposed within retainer nut 444 and NFC component 414 may be disposed within attachment member 424. NFC component 434 may be coupled with one or more sensors $432_1$-$432_2$. Sensors $432_1$-$432_2$ may be disposed within various portions of container 430. It is noted that any number of sensors may be utilized and/or comprised within various components. For instance, a first sensor $432_1$ may be disposed within blade assembly 450 and a second sensor $432_2$ may be disposed within a wall 446 of container 430. It is further noted that the sensors $432_1$-$432_2$ may be coupled to NFC component 434 via a wired connection, such as bus 454. In another aspect, the sensors $432_1$-$432_2$ may be coupled to the NFC component 434 (and/or NFC component 414) via a wireless connection. According to an example, the sensors $432_1$-$432_2$ may comprise NFC components that may be powered (e.g., directly or indirectly) by NFC component 414.

The sensors $432_1$-$432_2$ may include temperature sensors, motions sensors, audio sensors, or the like. NFC component 434 may receive data from the sensors $432_1$-$432_2$ and may transmit the sensor output to the blender base 410, such as via NFC component 414. In an example, one or more of sensors $432_1$-$432_2$ may measure temperature of a mixture from inside of the container 430. The temperature may be communicated to the NFC component 414. When then temperature reaches a desired threshold or temperature range, the blender base 410 may advance a blending program. For instance, a user may add ingredients for a soup recipe. The user may then select a soup setting (and/or a desired temperature). As the ingredients are blended and/or heated, the one or more sensors $432_1$-$432_2$ may measure the temperature within the container 430. When a desired temperature is reached, the blender base 410 may end the blending process.

In another example, the blender base 410 may utilize the temperature in the container in a feedback loop to control the speed, fluid shear and friction heating. This may be used to keep a mixture at a certain temperature. For example, in response to determining that a mixture exceeds a threshold or temperature limit (e.g., maximum, minimum, etc.), the blender base 410 may alter (e.g., reduce, increase, etc.) the speed of the blade assembly 450. The altered speed may result in altered friction heating to allow for temperature control of the mixture. It is noted that the blender base 410 may receive multiple temperature readings from different sensors. The blender base 410 may utilize the multiple readings to determine a temperature (e.g., average, etc.).

One or more of sensors $432_1$-$432_2$ may include motion sensors (e.g., gyroscopes, accelerometers, etc.), sound sensors, or the like. Such sensors $432_1$-$432_2$ may be utilized, for example, to determine the end of a blending program and/or a stage in a blending program. According to an embodiment, blender base 410 may determine to advance in a blending program when sensors $432_1$-$432_2$ reach a steady state indicating that a blending program may advance. For instance, during a blending process, a mixture within the container 430 may transition through several stages or states. These states may be associated with particular motions (or set of motions), sounds, or the like. In an example, a user may add ingredients to the container 430. When the user adds ingredients, the blade assembly 450 may chop or otherwise blend the ingredients. This may result in audio spikes, sudden changes in movement, or the like. In an example, a user making a soup may add a carrot into the container 430. The blade assembly 450 will produce a chopping noise and/or cause a sudden-chop motion. These noises and/or motions may be represented by a particular output of audio and/or motion sensors (e.g., spikes, peeks, dips, etc.). As the carrots are blended with other foodstuff, the output of the sensors $432_1$-$432_2$ will eventually normalize (e.g., reach a steady or semi-steady state). When the output normalizes, the blender base 410 may determine that that a blending program may advance.

Blender system 400 may include lid 460 that may be operatively coupled to an open end 438 of container 430. Lid 460 may include a cap 462 that may be removably attached thereto. For instance, a user may remove cap 462 to add ingredients to container 430 during a blending process. According to embodiments, lid 460 may include one or more NFC component(s) 464. The NFC component 464 may be configured to communicate with an NFC component of the container 430 and/or blender base 410. In an aspect, the NFC component 464 may communicate with an NFC component 474 disposed within the container 430. It is noted that NFC component 464 may include or otherwise communicate with sensors (e.g., temperature, motion, etc.) as described herein. As described herein, embodiments may utilize various devices or methods to determine whether lid 460 is operatively coupled to container 430, such as reed switches, magnets, or the like.

In another aspect, when container 430, blender base 410 and lid 460 are operatively interlocked, the NFC component 414 may provide power to NFC component 434. The NFC component 434 may be coupled to NFC component 474, such as via bus 454, to provide power and/or otherwise communicate therewith. Likewise, NFC component 464 may receive power from NFC component 474. In at least one embodiment, the blender base 410 may determine whether the lid 460 is operatively coupled to the container 430. In response to determining that the lid is not interlocked with the container, the blender base 410 may disable or otherwise prevent operation of a motor (e.g., motor 312). Likewise, in response to determining that the lid is interlocked with the container, the blender base 410 may allow operation of the motor.

NFC component 464 may communicate directly with NFC component 414. For instance, NFC component 414 may be configured to power NFC component 464 when NFC component 464 is within a determined range. In an aspect, the range may be based on the height of container 430. Thus, when lid 460 is attached to container 430, and the container 430 is attached to base 410, NFC component 414 may detect NFC component 464 without the need for other NFC components (e.g., NFC component 434, 474, etc.).

In at least one embodiment, NFC component 414 may be configured to broadcast signals at various frequencies and/or to detect NFC components at various distances. For example, NFC component 414 may broadcast a signal to power NFC component 434. If NFC component 434 is detected (e.g., container 430 is interlocked with blender base 410), then NFC component 414 may broadcast a signal to power NFC component 464 (e.g., lid 460 is interlocked with the container 430). If the lid 460 is detected, then NFC component 414 may enter a monitoring process that monitors whether the lid 460 is removed and/or is no longer within the desired range. If the lid 460 is removed from the desired range, NFC component 414 will not be able to communicate with the lid 460 and system 400 may determine that the lid 460 is not interlocked with the container 430 and/or the container 430 is not interlocked with the blender base 410.

Figure 5:
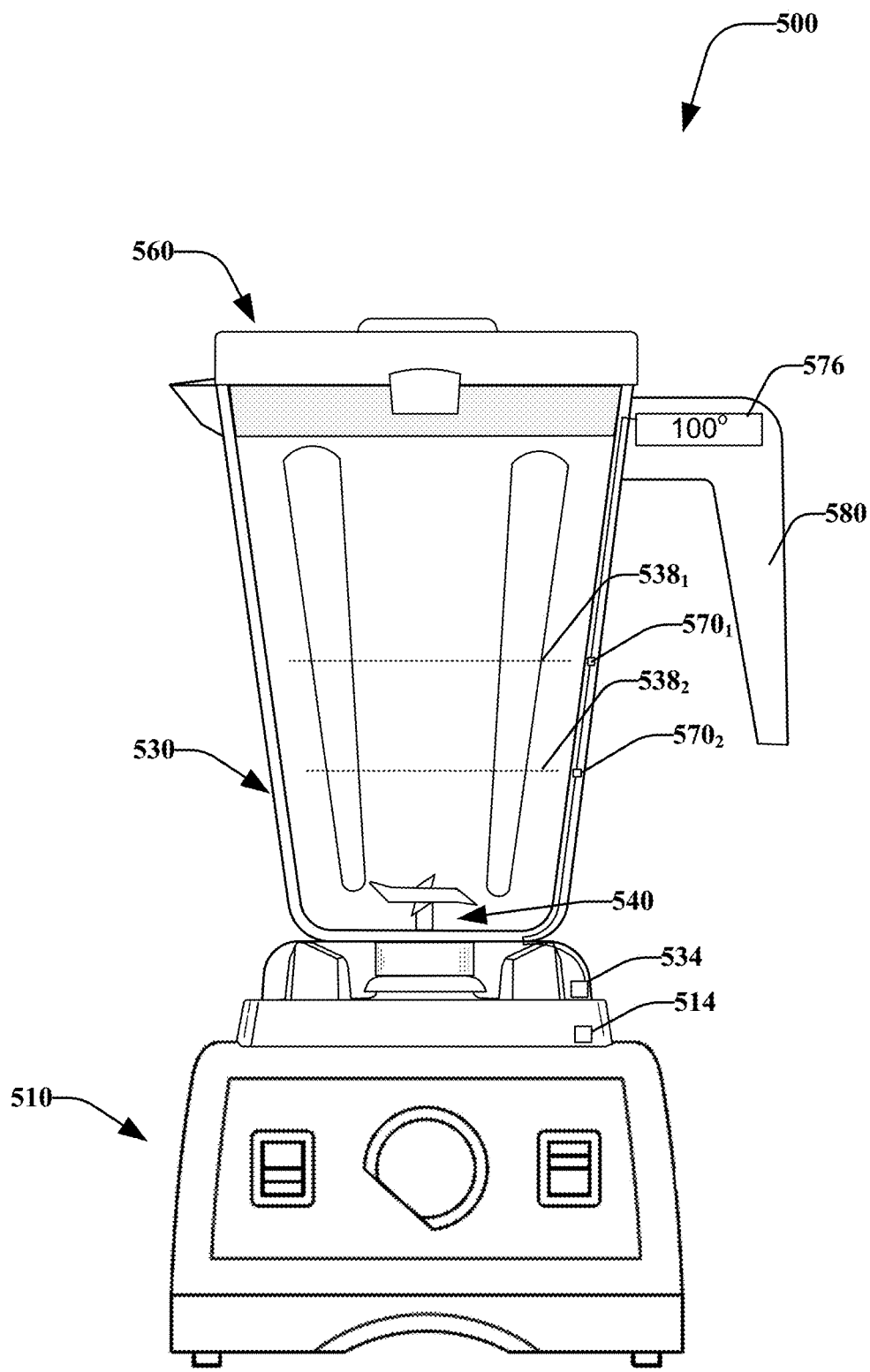
FIG. 5 is front view of a blending system including one or more visual display elements coupled to an NFC component in accordance with various disclosed aspects.

Turning to FIG. 5, there is a blender system 500 comprising NFC communication capabilities, in accordance with various described aspects. It is noted that blender system 500 may include all or some aspects as described with reference to FIGS. 2-3. Blender system 500 may primarily include blender base 510 (which may include NFC component 514), container 530 (which may include NFC component 534), and lid 560. In an aspect, blender base 510, container 530 and lid 560 may be interlocked together.

Container 530 may include indicia or gradient markers 5381-4382. It is noted that container 530 may include any number of gradient markers 5381-4382. In an aspect, the gradient markers 5381-4382 may represent measurements (e.g., volume) of contents within container 530. Gradient markers 5381-4382 may be etched, painted, molded, or otherwise formed on a surface of or within container 530. In at least one embodiment, container 530 may comprise visual display elements, such as light emitting diodes (LEDs) 571-472 and display 576. It is noted that other or different visual display elements may be utilized. It is also noted that other components of system 500 (e.g., lid 560, blender base 510, etc.) and/or disparate devices (e.g., user device 320) may comprise display elements. While visual display elements are described, it is noted that other notification mechanisms (e.g., audio, tactile, etc.) may be utilized.

NFC component 534 may control or power visual display elements, such as LEDs) 5701-4702 and display 576. The display elements may be disposed on a side of container 530, within container 530, on a handle 580, or the like. As shown, LEDs 5701-4702 may be disposed within a wall of container 530. It is noted that LEDs 5701-4702 may comprise one or multi-colored LEDs. In an example, a user may follow a recipe for a particular smoothie. As the user adds ingredients, the NFC component 534 may activate and/or deactivate the LEDs 5701-4702 to indicate the level at which ingredients should be added. In some embodiments, the blender system 500 may utilize pressure sensors (e.g., weight sensors), motion sensors (e.g., level or height sensor), or the like to determine when a user adds foodstuff to the container 560. Based on the sensors, the NFC component 534 may activate an appropriate LED to indicate the level to which the user should fill the container with a particular ingredient.

In another aspect, NFC component 534 may control a display 576 that may be disposed on a handle 580. The display 576 may comprise a digital display that may display textual or image data. The display 576 may display data associated with a blending process, such as a blending time (e.g., total time, time remaining, etc.), temperature, or the like. In another aspect, display 576 may display information specific to the container 530, such as a history of use (e.g., use cycles, run-time, etc.). It is noted that the NFC component 534 may be configured to cause the display 576 to render various other information. It is further noted that a display may be removably coupled to the container 530 and/or blender base 510.

Figure 6:
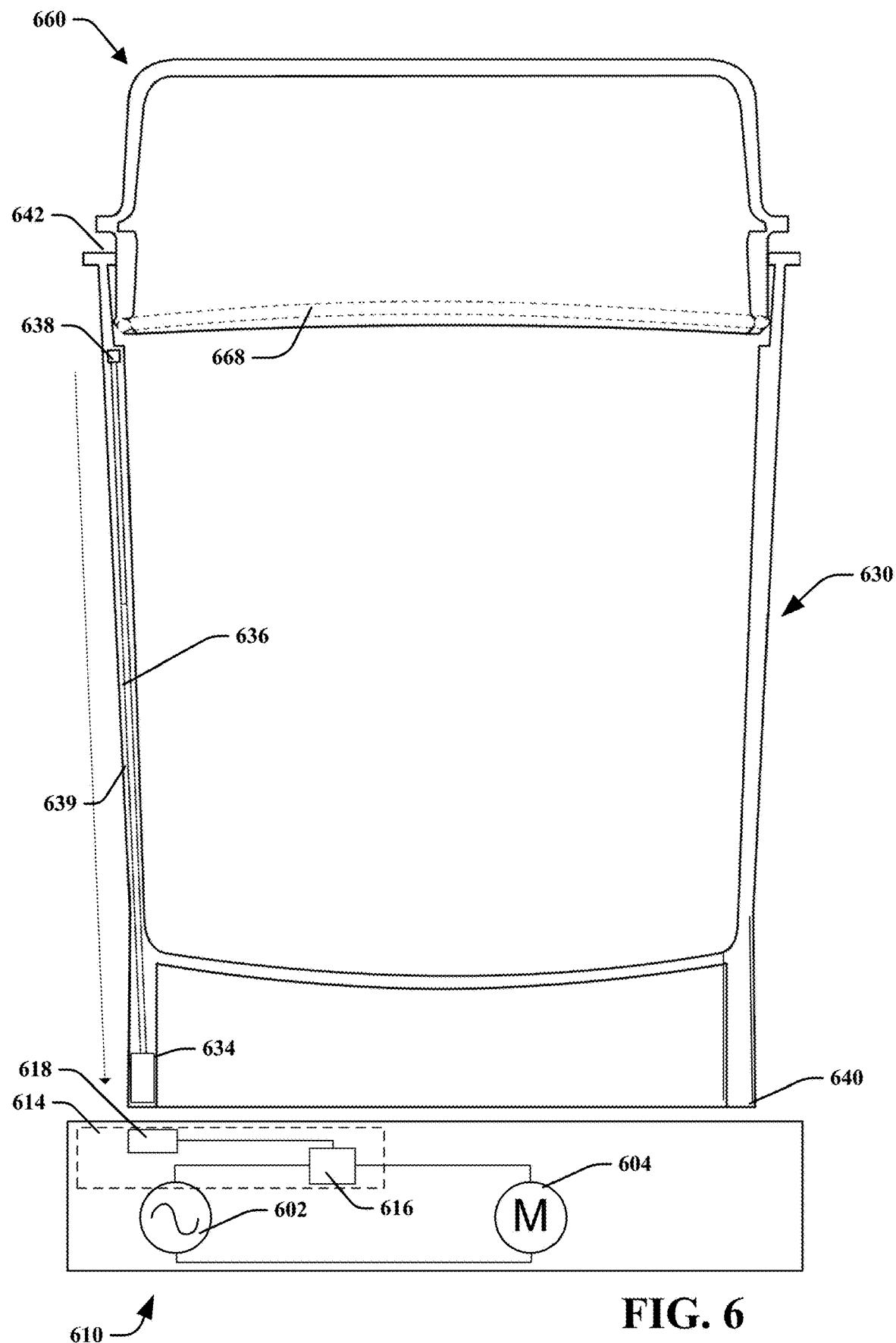
FIG. 6 is front view of a blending system including one or more reed switches in accordance with various disclosed aspects.

Turning to FIG. 6, there is a blender system 600 comprising NFC communication capabilities, in accordance with various described aspects. It is noted that blender system 600 may include all or some aspects as described with reference to FIGS. 2-4. Blender system 600 may primarily include base 610 (which may include NFC component 614, motor 604, and power source 602), container 630 (which may include NFC component 634), and lid 660. In an aspect, blender base 610, container 630 and lid 660 may be interlocked together (e.g., as shown in FIGS. 2 and 4-4).

It is noted that NFC component 614 may comprise a receiver/transmitter antenna 618 and a reader 616. The NFC component 614 may communicate with NFC component 634, which may include a transponder. It is noted that the NFC component 634 (or a portion thereof that receives/transmits signals) may be disposed proximal to a closed end 640 of container 630. This may allow system 600 to detect the NFC component 634 when the blender base 610, container 630, and lid 660 are operatively connected. In another aspect, this may prevent activation of a motor unless the container 630 is in short proximity of the top of blender base 610. It is further noted that the NFC component 634 may be located orthogonally, in parallel, or otherwise angled with respect to a top surface of blender base 610. If located orthogonally, to blender base 610, the antenna 618 may also be located orthogonally (e.g., parallel to NFC component 634) when the blender base 610 and the container 630 are operatively coupled.

According to embodiments, the NFC component 634 may comprise a transponder or coil that may be disposed proximal to a closed end 640 of container 634. The coil may include one or more connection lines 636 (e.g., wires) which may extend within or on wall 639 from proximal the closed end 640 of container 630, to proximal an open end 642 of container 630. The connection lines 636 may be coupled with or include one or more reed switches 638. In an example, the reed switches 638 may include y reed switches, where y is a number. For instance, reed switches 638 may include two reed switches that may be disposed at various locations proximal open end 642. Reed switches 638 may be in a closed or open state based on lid 660.

Lid 660 may include a triggering member, such as one or more magnet(s) 668. Magnet 668 may include individual magnets, a magnetic band or strip, or the like. The magnet 668 may be covered (e.g., over molded, etc.), disposed within lid 660, or the like. In an example, a user may place lid 660 on the container 630 and may operatively attach the lid 660 there to (e.g., press fit, screw on, latch, etc.). When operatively attached, the magnet 668 may engage (e.g., close) the reed switches 638. This may close the coil of NFC component 634. If the user removes the lid 660, the magnet 668 will not engage the reed switches 638 and the reed switches 638 will be open. System 600 may provide selective power to a motor based on a state of the reed switches 638. For instance, when closed, the NFC component 634 may transmit; when open, the NFC component 634 may not transmit.

While blender system 600 describes reed switches 638 and magnet 668, it is noted that embodiments may utilize other switches or mechanisms to detect whether lid 660 is operatively attached to container 630. For instance, embodiments may utilize mechanical switches, pressure sensors, or the like.

Figure 7:
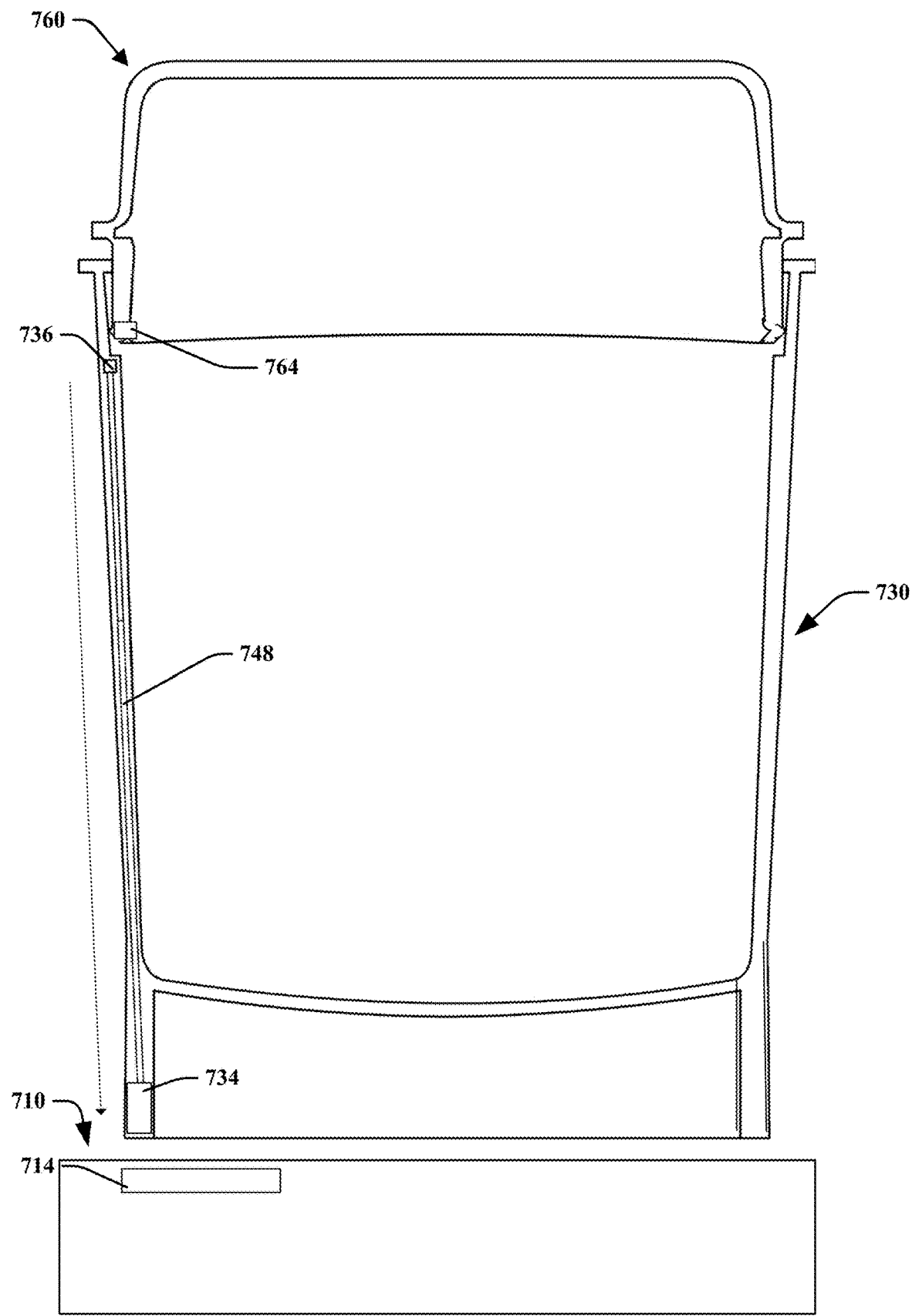
FIG. 7 is front view of a blending system including one or more NFC components arranged in series in accordance with various disclosed aspects.

FIG. 7 is a blender system 700 comprising NFC communication capabilities, in accordance with various described aspects. It is noted that blender system 600 may include all or some aspects as described with reference to FIGS. 1-6. Blender system 700 may primarily include blender base 710 (which may include NFC component 714), container 730 (which may include NFC components 734 and 736), and lid 760 (which may comprise a triggering member, such as an NFC component 764). In an aspect, blender base 710, container 730 and lid 760 may be interlocked together.

As described herein, blender container 730 may include one or more NFC components (734, 736, etc.) that may each comprise transceivers/coils. The coils may be wound and connected in series. When system 700 is operatively interconnected, NFC component 736 may be powered via NFC component 734 and connection lines 737. In another aspect, NFC component 736 may communicate with NFC component 764 of lid 760. In at least one embodiment blender container 730 may include one NFC chip and multiple coils. Likewise, lid 760 may include one NFC chip and multiple coils. While NFC component 736 is shown as connected via a wired connection 748 with NFC component 734, it is noted that the NFC components 734/736 may communicate wirelessly.

Figure 8:
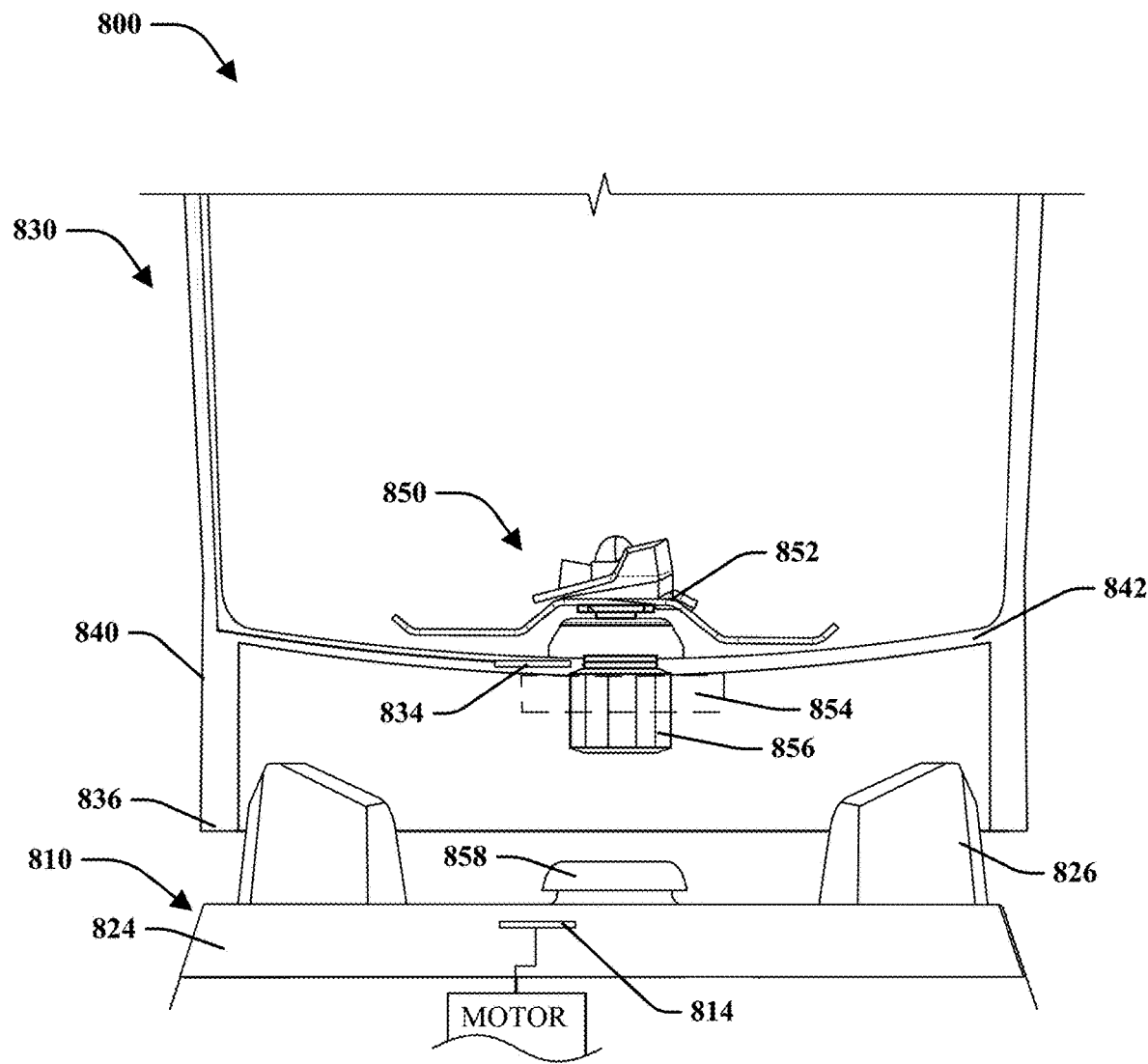
FIG. 8 is a partial, cross-sectional view of a blending system including a container NFC component, a base NFC component, and a motor.

Turning now to FIG. 8, there is a blender system 800 that may determine whether it is interlocked in accordance with various described aspects. As above, it is noted that similarly named components may comprise similar, different, or identical features or functionality. For example, base 810 may be the same or a different base as base 110, 210, etc. It is further noted that system 800 may be modified, combined, or altered in accordance with the scope and spirit of the present teachings. For instance, system 800 may include a lid and other components as described with reference to the various disclosed embodiments.

System 800 may include a container 830 that may be interlocked with a base 810. The container 830 may include at least one NFC component 834 that may communicate with an NFC component 814 of the base 814. In an aspect, the NFC component 834 and NFC component 814 may have limited coverage areas, such that they communicate when the container 830 and base 810 are substantially interlocked, and they do not communicate when the container 830 and base 810 are not substantially interlocked. This may allow a controller to enable or disable a motor 804, which may allow/prevent the motor 804 from driving the blade assembly 850.

As depicted, the NFC component 834 may be disposed within a wall of closed end 842. In an aspect, the NFC component 834 may be disposed proximal a blade assembly 850 and/or a central point of the closed end 842. In this arrangement, the NFC component 814 may be generally disposed proximal a splined coupler 858, which receives a splined shaft 856 of the blade assembly 850. In this way, NFC component 814 and NFC component 834 may be within range of each other no matter the orientation of the container 830 relative the base 810. It is noted that various other arrangements are contemplated. For instance, NFC components or antennas may be disposed within protrusions 826, apron 840, at various portions of closed end 842 (e.g., proximal protrusions 826 when interlocked), near proximal end 836, or the like.

Figure 9:
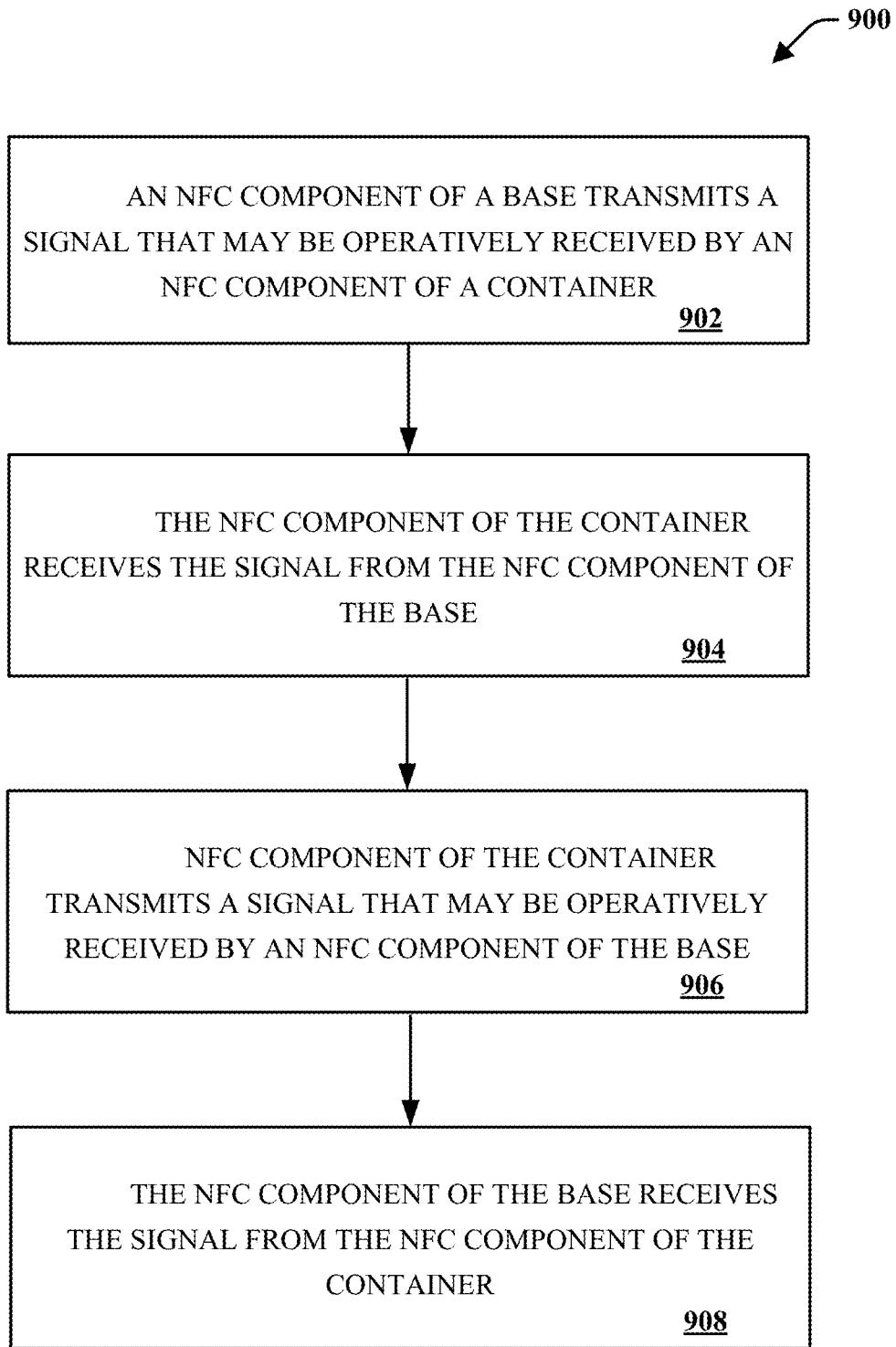
FIG. 9 is a method of operating a blender system in accordance with various disclosed embodiments.
Figure 10:
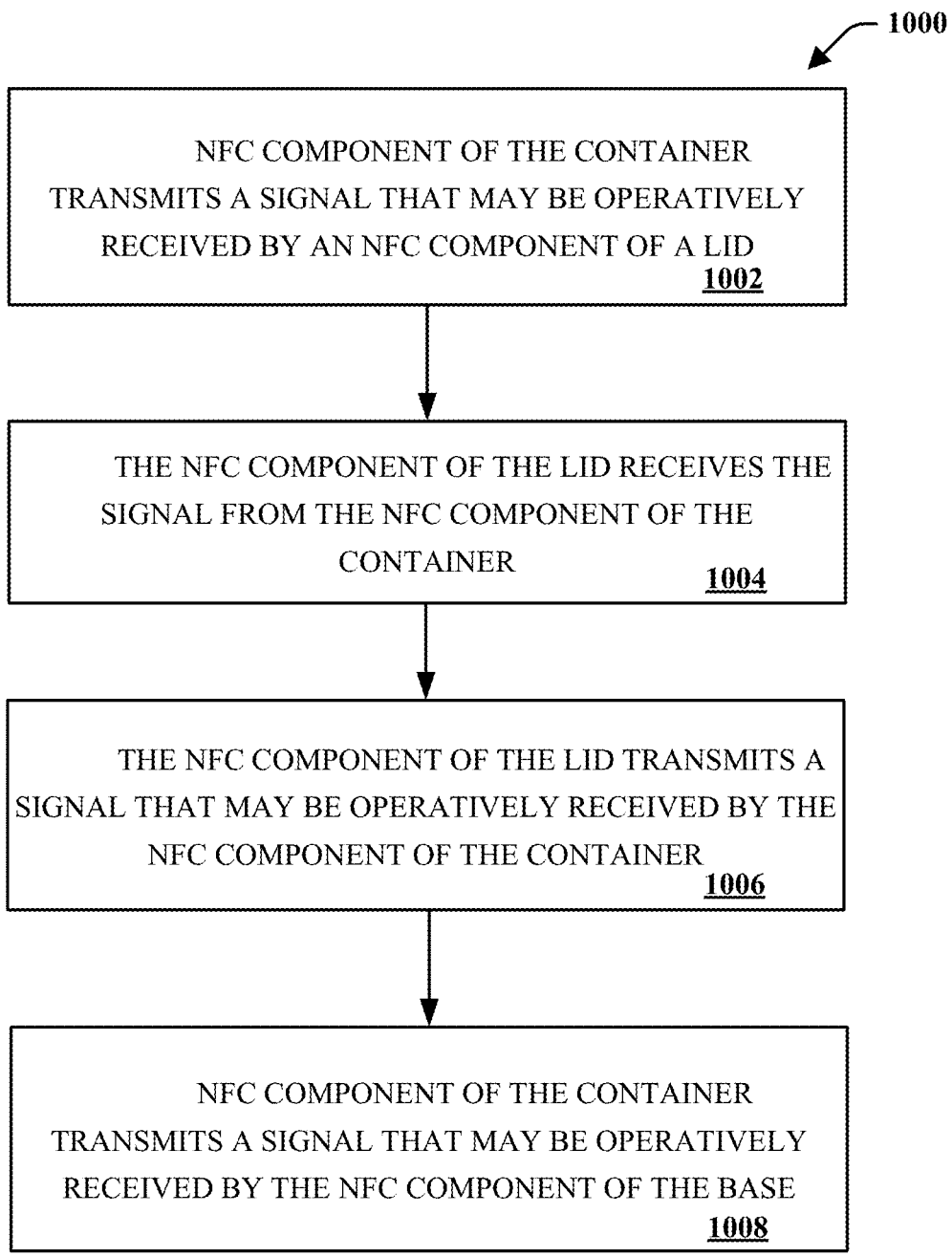
FIG. 10 is a method of operating a blender system comprising container, base, and lid in accordance with various disclosed embodiments.

In view of the subject matter described herein, a method that may be related to various embodiments may be better appreciated with reference to the flowcharts of FIGS. 9-10. While methods 900 and 1000 are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 9 depicts an exemplary flowchart of non-limiting method 900 associated with a blender system, according to various aspects of the subject disclosure. At 902, an NFC component of a base (e.g., NFC component 214, etc.) may transmit a signal that may be operatively received by an NFC component of a container. The signal may comprise an operative coverage area where the signal may be received by the NFC component of the container.

At 904, the NFC component of the container (e.g., NFC component 234, etc.) operatively receives the signal from the NFC component of the base. In an aspect, the NFC component of the container may receive the signal when the container is interlocked with the base. The signal may excite the NFC component of the container as described herein. It is noted that the signal may comprise a request, query, listening procedure, or the like.

At 906, the NFC component of the container transmits a signal (e.g., a response signal) that may be operatively received by an NFC component of the base. For example, the response signal may comprise an acknowledgment that the NFC component of the container received the signal from the NFC component of the base. It is noted that the response signal may comprise other or different information, such as a container ID, usage data, recipes, or the like.

At 908, the NFC component of the base receives the signal from the NFC component of the container. The NFC component of the base may utilize the signal to allow a motor to operate, update stored information, track a history of the container, receive recipes, or the like. In an aspect, method 900 may allow a system (e.g., system 100, 200, etc.) to determine whether a container and a blender base are interlocked. For instance, an NFC component of a blender base may transmit a signal that may be receivable by an NFC component of a container.

At 904, the system may receive input from an NFC component of the container. For instance, the NFC component of the container may receive a signal and/or power from the NFC component of the blender base. The signal may excite the NFC component of the container and the NFC component of the container may transmit a signal to be received by the NFC component of the blender base.

FIG. 10 depicts an exemplary flowchart of non-limiting method 1000 associated with a blender system, according to various aspects of the subject disclosure. The method 1000 may be utilized to determine whether a blender system comprising a lid, container, and base is interlocked. It is noted that the method may be utilized for other or different purposes. In an aspect, an NFC component of a base may transmit a signal to an NFC component of a container similar to reference numerals 902 and 904.

At 1002, the NFC component of the container operatively transmits a signal that may be operatively received by an NFC component (e.g., NFC component 464, etc.) of a LID. It is noted that the container may comprise one or more NFC tags that may transmit the same or different signals.

At 1004, the NFC component of the lid receives the signal from the NFC component of the container. For instance, the signal may excite and/or power the NFC component of the lid. Exciting the NFC component of the lid may induce a reaction or response.

At 1006, the NFC component of the lid may transmit a signal (e.g., response signal) that may be operatively received by the NFC component of the container. For instance, the NFC component of the lid, in response to excitement, may execute one or more instructions that may result in a responsive signal transmitted to the lid. The NFC component of lid may then receive the responsive signal, and in response, communicate with the base (e.g., which may include transmitting via one or more NFC components of the container).

At 1006, the NFC component of the container transmits a signal that may be operatively received by the NFC component of the base. The base may determine whether the system is interlocked, whether the lid is not attached, or the like. In an aspect, the base may comprise a display that generates a notification to a user to identify that the lid is not interlocked.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender system comprising:
    a base comprising a motor and a first near field communication component;
    a container comprising a second near field communications component in communication with the first near field communication component; and
    a user device in communication with the first and second near field communication components,
    wherein the second near field communication component communicates usage data of the container to the user device.

2. The blender system of claim 1 further comprising a second container comprising a third near field communication component, the third near field communication component communicates usage data of the second container to the user device.

3. The blender system of claim 2, wherein the user device provides direction to the base based on the usage data of the container.

4. The blender system of claim 3, wherein the direction comprises not operating the motor.

5. The blender system of claim 3, wherein the direction comprises transitioning from a first state of operation of the motor to a second state of operation of the motor.

6. A blender system comprising:
    a base comprising a motor and a first near field communication component;
    a container comprising a second near field communications component in communication with the first near field communication component; and
    a user device in communication with either of the first and second near field communication component,
    wherein either the first or the second near field communication components communicates usage data of the container to the user device.

7. The blender system of claim 6, wherein the user device is in communication with the second near field communication component.

8. The blender system of claim 6, wherein the second near field communication component communicates usage date of the container to the user device.

9. The blender system of claim 6 further comprising a second container comprising a third near field communication component, the third near field communication component communicates usage data of the second container to at least one of the base and the user device.

10. The blender system of claim 9, wherein the motor will not run if the usage data of the first container exceeds a predetermined amount of usage.

11. The blender system of claim 9, wherein operation of the motor is adjusted based on the usage data of the first container.

12. The blender system of claim 11, wherein the adjustment of the motor comprises transitioning from a first state of operation of the motor to a second stage of operation of the motor.

13. The blender system of claim 6, wherein the first near field communication component sends an instruction to the second near field communication component to cause the second near field communication component to update information stored therein.

14. The blender system of claim 6, wherein the first near field communication component sends an instruction to a user device to cause the user device to update information stored therein regarding usage of the container.

15. A blender system comprising:
    a base including a motor and a first near field communication component;
    a container comprising a second near field communications component in communication with the first near field communication component, the second near field communication component comprising a memory; and
    a user device in communication with the first and second near field communication component,
    wherein the second near field communication component communicates usage data of the container to the user device, the memory stores the usage data, and the second near field communication component transmits at least one operational instruction to the first near field communication component to operate the motor.

16. The blender system of claim 15, wherein the second near field communication component includes a memory storing data regarding a type of product blended in the container.

17. The blender system of claim 16, wherein the second near field communication component receives the data regarding the type of product blended in the container, and determines whether to select the container for preparation of a recipe.

18. The blender system of claim 17, wherein the user device determines whether to select the container based on comparing the data regarding the type of product blending in the container matches a predetermined set of data to allergen data of the recipe.

19. The blender system of claim 17, wherein the user device transmits an identification token of the container to the base in response to determining to select the container.

20. The blender system of claim 19, wherein the first near filed communication component detects an identification token of a container within a coverage area of the first near field communication prevents operation of the motor if detected identification token does not match the identification token received from the user device.

* * * * *